United States Patent
Yamada

[11] Patent Number: 6,044,937
[45] Date of Patent: Apr. 4, 2000

[54] BRAKE BAND DEVICE FOR AUTOMATIC TRANSMISSION

[75] Inventor: Toshiyuki Yamada, Hirakata, Japan

[73] Assignee: Exedy Corporation, Neyagawa, Japan

[21] Appl. No.: 09/400,920

[22] Filed: Sep. 21, 1999

[30] Foreign Application Priority Data

Sep. 22, 1998 [JP] Japan .................................. 10-267552

[51] Int. Cl.[7] .................................................. F16D 51/00
[52] U.S. Cl. .......................................... 188/77 R; 192/80
[58] Field of Search ............................ 188/77 R, 177 W; 192/79, 80, 81 R, 81 C

[56] References Cited

U.S. PATENT DOCUMENTS

| | | | |
|---|---|---|---|
| 2,637,420 | 5/1953 | Churchill | 188/77 R |
| 4,058,189 | 11/1977 | Chamberlain et al. | 188/77 R |
| 4,384,637 | 5/1983 | Runkle | 188/77 R |
| 5,921,355 | 7/1999 | Mostrom | 188/77 R |

*Primary Examiner*—Matthew C. Graham
*Attorney, Agent, or Firm*—Shinjyu An Intellectual Property Firm

[57] ABSTRACT

A brake band device (1) for engagement and dis-engagement (braking and releasing) a cylindrical clutch drum of an automatic transmission includes a strap (12) formed of a belt-like member shaped into a substantially circular form, with a gap defined between ends of the strap (12). A lining (13) is fixed to the inner peripheral surface of the strap (12) and is engageable with the outer peripheral surface of the clutch drum. A pair of arc-shaped brackets (14) are fixed to each of ends of the strap (12), respectively. The strap is formed with a plurality of slightly deformed portions that extend slightly radially inwardly from other portions of the strap (12) thereby providing the strap (12) with a biasing force that allows for improved dis-engagement with the clutch drum.

3 Claims, 4 Drawing Sheets

BRAKE BAND DEVICE FOR AUTOMATIC TRANSMISSION

BACKGROUND OF THE INVENTION

A. Field of the Invention

The invention relates to a brake band device, and particularly a brake band device for selectively braking rotation of a cylindrical clutch drum within an automatic transmission.

B. Description of the Background Art

An automatic transmission is generally provided with a plurality of clutch devices and brake band devices for automatic gear changes. These clutch devices and brake band devices are used in a wet environment, i.e., in the presence of lubricating oil.

One such brake band device typically includes a strap that extends around a clutch drum forming one clutch device. The strap is a band-like member having a substantially circular form. A lining is fixed to the inner peripheral surface of the strap and a pair of brackets fixed to or formed on at opposite ends of an outer surface of the strap.

In the brake band device, the lining is made of a friction material that is pressed against the outer peripheral surface of the clutch drum by moving the paired brackets toward each other thereby tightening the brake around the rotating clutch drum. Contact between the lining and the outer surface of the clutch drum causes the clutch drum to be braked, ceasing rotation. When the clutch drum stops rotating, the clutch device enters an engaged state thereby effecting a shift in gears. Typically, an automatic transmission has several brake band devices, each brake band device corresponding to a specific gear speed for torque transmission.

For reducing loads applied to the brake band during the above engagement operation, the brake band is configured so that it can brake and release of the clutch drum in response to slight changes of the inner diameter of the brake band. Therefore, only a small annular gap is formed between the brake band and the clutch drum in a released or dis-engaged state.

Since the clutch device and the brake band device are used in the wet conditions as described above, a film of lubricating oil is formed over the outer peripheral surface of the clutch drum. Since only the small annular gap is present between the brake band and the clutch drum, the gap is typically filled with the lubricating oil. Therefore, the brake band cannot be quickly released from the clutch drum due to a viscous resistance of the lubricating oil even when an operation is performed to release the clutch drum by loosening the brake band in a releasing or dis-engaging operation. Thus, the brake band impedes the rotation of the clutch drum, and a so-called "drag" occurs. Such drag is undesirable.

In the a dis-engaged state, forces act on the brake band (the strap) causing it to further loosen or enlarge. Such forces result from rotation of the clutch drum.

Tightening and loosening of the brake band (strap) is effected by movement of a hydraulically controlled piston that engages one end of the brake band. One way to prevent drag is to increase the overall movement of the piston, thereby further loosening the brake band. However, when the piston is hydraulically moved to engage the brake band with the clutch drum to brake rotation of the clutch drum, the increase in overall movement of the piston requires an increased use of oil which must be taken from within the automatic transmission. Such an increase of oil may deprive clutch disks of required lubrication. Further, the movement of the piston will take longer than is desirable, possibly affecting performance of the automatic transmission.

SUMMARY OF THE INVENTION

An object of the invention is to improve release-ability of the brake band from the clutch drum in the clutch drum dis-engagement operation, and thereby prevent adhesion of the brake band onto the clutch drum during idling of the clutch drum.

In accordance with one aspect of the present invention, there is a brake band that is used in a brake band device for braking and releasing a cylindrical clutch drum of an automatic transmission. The brake band includes a generally cylindrically shaped strap having a belt-like configuration, the strap having two ends with a gap defined between the ends. A lining is fixed to an inner surface of the strap and is adapted to contact an outer peripheral surface of the clutch drum. A pair of arc-shaped brackets are fixed to respective ends of the strap. The strap is formed with two pairs of slightly deformed portions, each of the deformed portions extending slightly radially inward from other portions of the strap. The deformed portions are located on the strap such that a first inner diameter of the strap extends between a first of the pairs of deformed portions and a second inner diameter extends between a second pair of the deformed portions. The first and second diameters are perpendicular with respect to one another. The other portions of the strap define third and fourth inner diameters. The third inner diameter is perpendicular to the fourth inner diameter, the third inner diameter is offset from the first inner diameter by 45 degrees. The first and second inner diameters are smaller than the third and fourth inner diameters.

Preferably, a roundness of the strap is defined as the sum of the third and fourth inner diameters divided by the sum of the first and second inner diameters, as follows:

$$\text{roundness} = \frac{\text{(3rd diameter} + \text{4th diameter)}}{\text{(1st diameter} + \text{2nd diameter)}}$$

and, the roundness is larger than 1.0 but smaller than 1.04.

In this device, the paired brackets are moved toward each other for reducing the diameters of the strap and the lining so that the lining is pressed against the outer peripheral surface of the clutch drum. Thereby, the clutch drum is braked to stop its rotation. When the clutch drum stops the rotation, the clutch device enters the engaged state. When the brackets are moved away from each other, the clutch drum is released so that the clutch device can dis-engage easily and quickly from the clutch drum.

Since the strap has an undulated shape as described above in a dis-engaged state, the brake band is easily dis-engaged from the clutch drum in the brake dis-engagement operation due to the undulations in the strap, and drag on the clutch drum can be suppressed. It is also possible to prevent adhesion of the brake band onto the clutch drum through the lubricating oil during idling of the clutch drum.

These and other objects, features, aspects and advantages of the present invention will become more fully apparent from the following detailed description of the present invention when taken in conjunction with the accompanying drawings where like reference numerals denote corresponding parts throughout.

DESCRIPTION OF THE PREFERRED EMBODIMENTS

Figure 1:
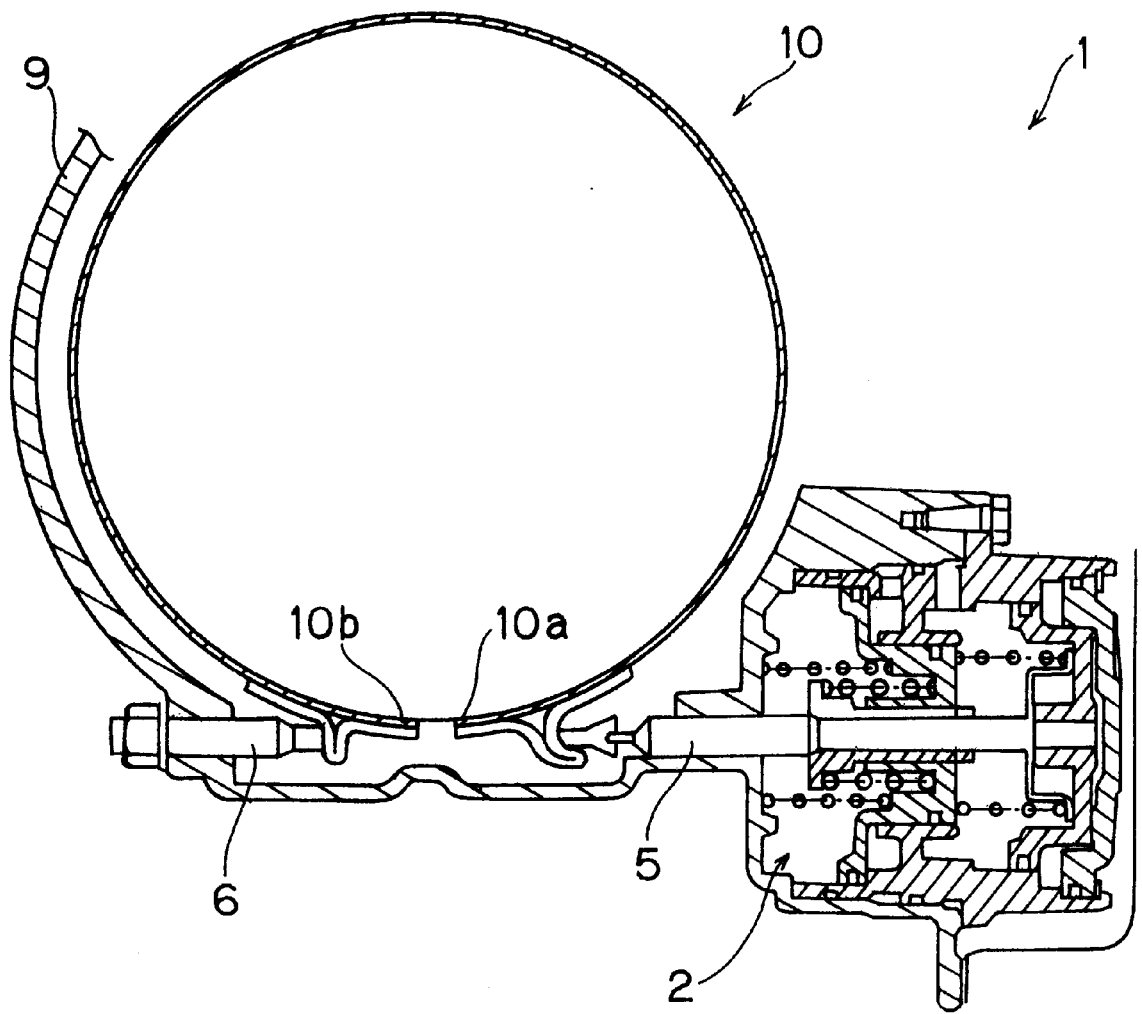
FIG. 1 is a cross-section side view of a brake band device having a brake band in accordance with one embodiment of the present invention.

FIG. 1 is a cross-section side view of a brake band device 1 in accordance with one an embodiment of the present invention.

The brake band device 1 includes a brake band 10. The brake band 10 includes and end 10a and an end 10b, each formed with a contact portion. The brake band 10 can be brought into contact with an outer periphery of a clutch drum (not shown) forming a clutch device for braking the drum. A piston stem 5 is moveable in response to hydraulic pressure within a piston chamber 2. The piston stem 5 contacts the end 10a of the brake band 10 thereby moving the end 10a toward the other end 10b of the brake band 10, thereby tightening an inner peripheral surface of the brake band 10 around an outer surface of the clutch drum (not shown). With the brake band 10 tightened around the clutch drum, the clutch drum is braked and therefore unable to rotate. The other end 10b of the brake band 10 contacts an anchor stem 6 thereby restricting movement of the other end 10b of the brake band 10 making tightening of the brake band 10 possible.

The piston chamber 2 has a plurality of oil chambers for controlling movement of the piston stem 5 by supplying or draining working fluid into or from the respective oil chambers. A hydraulic fluid pressure control device is typically associated with the piston chamber 2. Such hydraulic fluid pressure control devices are well known in the art, in particular in automatic transmissions that employ hydraulic pressure to control clutch engagement and dis-engagement.

With specific reference to FIGS. 2 and 3, the brake band 10 is described below in greater detail.

Figure 2:
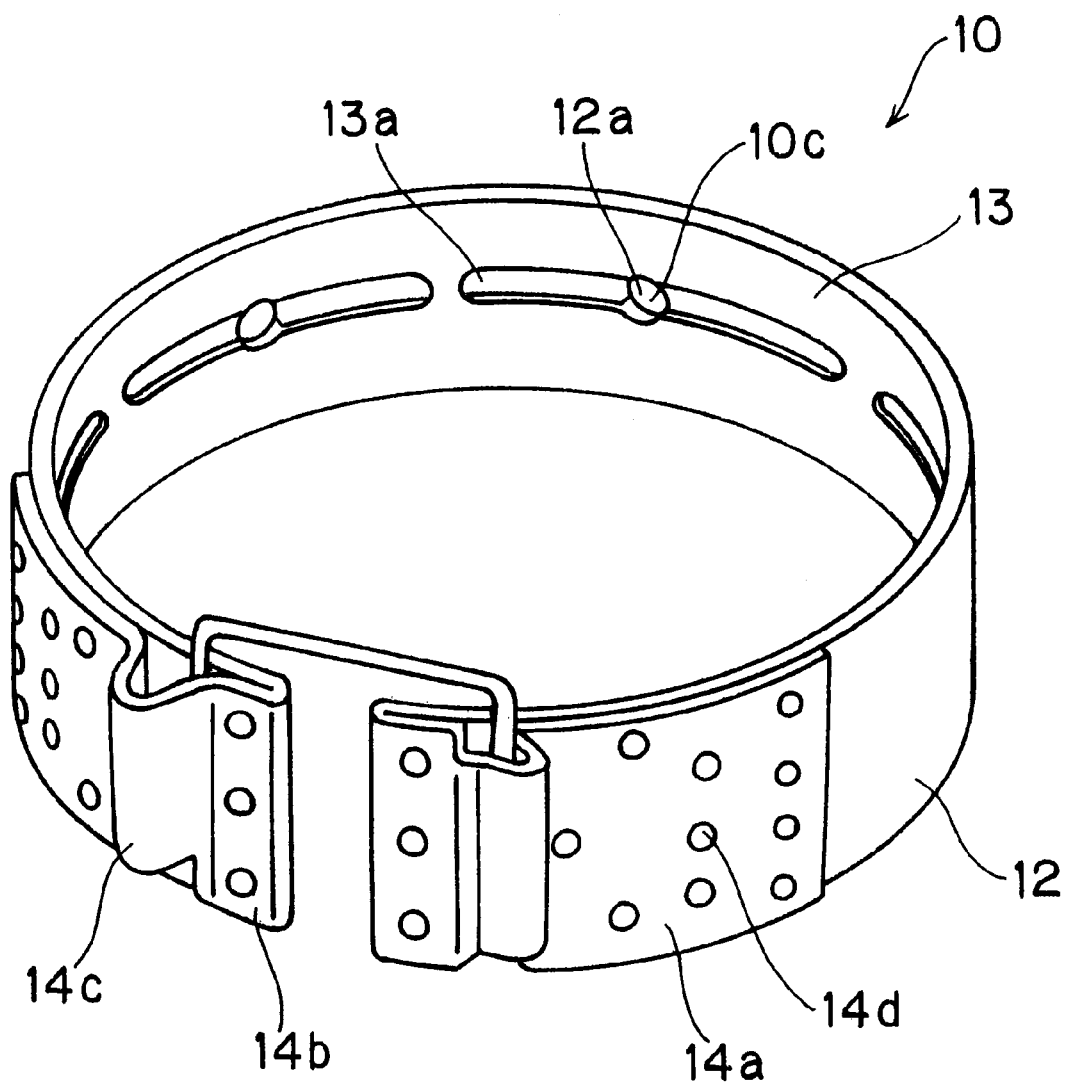
FIG. 2 is a perspective view of the brake band shown removed from the brake band device depicted in FIG. 1.

As shown in FIG. 2, the brake band 10 includes a strap 12, a lining 13 attached to an inner surface of the strap 12, and a pair of brackets 14a and 14b fixed to the opposite ends of the strap 12, respectively. As shown in FIG. 2, the brackets 14a and 14b may be formed along with the strap 12 and bent back to form the brackets, or alternatively, the brackets 14a and 14b may be separate pieces fixed to the strap 12.

The strap 12 is formed of an elongated strip of spring steel such as SK5, is preferably about 0.5 mm in thickness. The strap 12 is formed into an arc-shaped almost forming a complete circle or annular band. The strap 12 is provided with a plurality of through-holes 12a for allowing circumferential movement of oil on the clutch drum surface (not shown).

Figure 3:
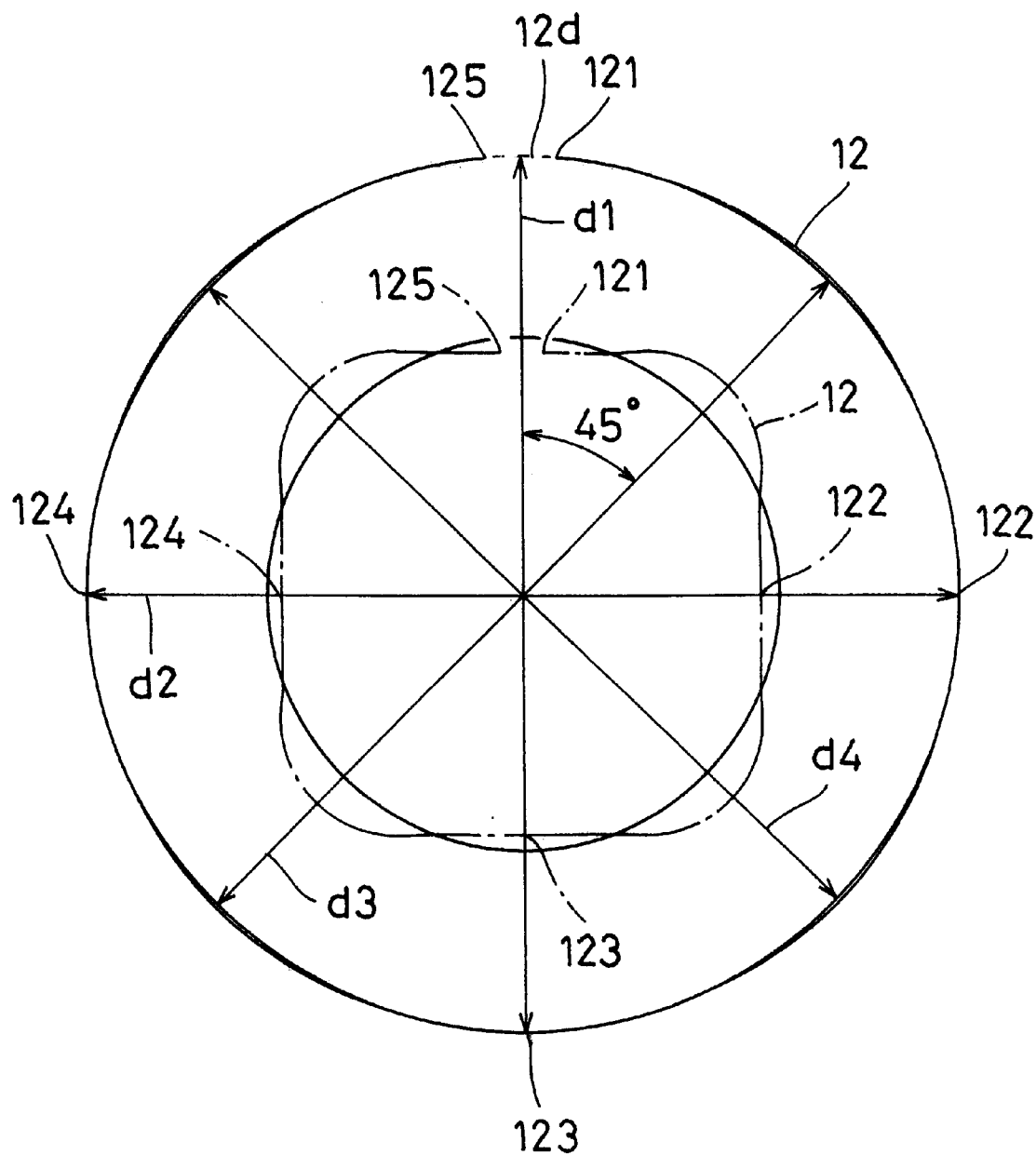
FIG. 3 is a schematic side view of the brake band showing the form and shape of the brake band.

As shown in FIG. 3, the strap 12 is not in the shape of a perfect circle. Rather, several portions of the strap 12 are intentionally deformed in such a way as to provide the strap 12 with a very slight undulated or wavy form. Specifically, the strap 12 is formed with portions 122, 123 and 124 that are deformed to extends slightly radially inwardly compared to the remainder of the strap 12. Further, the end portions 121 and 125 are similarly deformed to extend slightly radially inwardly. A diameter d1 is defined between the end portions 121 and 125 and the portion 123. Further, a diameter d2 is defined between the portion 122 and the portion 124.

Diameters d3 and d4 extend between portions of the strap 12 that are not deformed to extend slightly radially inward. Specifically, as is indicated in FIG. 3, the portions of the strap 12 at the diameters d3 and d4 extend radially outward from the portions 121, 122, 123, 124 and 125 at diameters d1 and d2. As should be clear from the above description, the diameters d1 and d2 are slightly smaller than the diameters d3 and d4.

It should be understood that the diameter d1 is represented in FIG. 3 as being measured in a gap 12d formed between the portions 121 and 125. However, if an arc is drawn between the portions 121 and 125, the diameter d1 is measured at that arc, where the arc has the same radial distance from a center of the strap 12 as the portions 121 and 125.

It should further be understood that the diameter d1 is perpendicular to the diameter d2. Further, the diameter d3 is perpendicular to the diameter d4. The diameters d3 and d4 are offset from the diameters d1 and d2 by 45 degrees. The above relationships between the various diameters d1, d2, d3 and d4 are specific to the depicted embodiment. Alternate configurations are also possible. For instance, with the portions 121 and 125 being considered as a single portion of the strap 12, there basically four portions of the strap 12 that are deformed to extend slightly radially inwardly. Alternatively, three, five, six or more portions may be deformed to extend slightly inwardly. The configuration in FIG. 3 is only one embodiment.

The strap 12 is configured such that a sum of the first inner diameter d1 and the second inner diameter d2 is smaller than a sum of the third inner diameter d3 and the fourth inner diameter d4.

In a central portion of FIG. 3, alternating long and short dashed lines concentric within the strap 12 represent, in an exaggerated representation, the shape of the strap 12. Specifically, the deformed portions 121 and 125, 122, 123 and 124 are exaggerated in the long and short dashed line representation.

As shown in FIG. 2, the lining 13 is a belt-like friction member which can be brought into contact with the outer peripheral surface of the clutch drum. The lining 13 preferably has a generally uniform thickness of 1 mm and further has a circumferential length and axial width substantially equal to corresponding dimensions of the strap 12. The lining 13 is adhered to the inner peripheral surface of the strap 12, and can is brought into contact (friction engagement) with the clutch drum (not shown) in response to movement of the piston stem 5.

The lining 13 is provided with a plurality of through-holes 13a for circumferentially releasing the lubricating oil on the clutch drum surface, as is done in the strap 12. Each through-hole 13a is elongated in a circumferential direction with respect to the strap 12, and is open to the through-holes 12a formed in the strap 12. Owing to the above structure, the brake band 10 is provided with through-holes 10c defined by the through holes 12a and 13a, and the lubricating oil on the clutch drum surface can discharge through the holes 10c.

The brackets 14a and 14b are metal members, which are made of a material S50C and have a thickness of 2.3 mm, and are fixed to the outer peripheral surfaces of the opposite ends of the strap 12. The bracket 14 has a support portion 14c formed of a folded or bent portion, and a plurality of apertures 14d formed at the surface of the bracket 14.

Below is a description of the operation of the operation of the brake band device 1 having the brake band 10.

When engagement of the clutch brake is desired, hydraulic pressure is applied to the piston chamber 2 so that the piston stem 5 controlled by the piston chamber 2 moves toward the clutch drum. In this operation, the piston stem 5 pushes the end 10a of the brake band 10 toward the other end 10b of the brake band 10. Thereby, the brake band 10 is tightened around the outer surface of the clutch drum. As a result of the tightening of the brake band 10, the brake band 10 deforms thereby coming into contact with the outer peripheral surface of the clutch drum because the other end 10b of the brake band 10 is fixed in position by the anchor stem 6. In this operation, five portions 121, 122, 123, 124 and 125 of the brake band 10 are deformed radially inward thereby reducing the inner diameter of the brake band 10. As a result, portions of the lining 13 at the portions 121, 122, 123, 124 and 125 of the strap 12 come into contact with the outer peripheral surface of the clutch drum. As the end 10a of the brake band 10 is further pushed, the brake band 10 deforms into a circular form conforming to the outer peripheral surface of the clutch drum. Owing to the friction between the lining 13 of the brake band 10 and the clutch drum, the clutch drum is braked and stops rotating. In this state, the clutch device is engaged.

When the clutch device changes from the engaged state to a disengaged state, the piston stem 5 controlled by the piston chamber 2 moves away from the clutch drum 5 so that the brake band 10a moves away from the clutch drum. Since the viscous resistance of the lubricating oil is irregular over the clutch drum surface owing to the presence of the gaps with respect to the clutch drum, the portions 121, 122, 123, 124 and 125 of the brake band 10 which are deformed inward are easily dis-engaged from the clutch drum surface in a spring like manner, and the brake band 10 can easily increase its inner diameter to dis-engage from the clutch drum. Therefore, the clutch drum can rotate without drag by the brake band.

For the following tests, the following relationship was used. The roundness of the brake band 10 is defined as the sum of the diameters d3 and d4, divided by the sum of the diameters d1 and d2, as follows:

$$\text{roundness} = \frac{d3 \text{ and } d4}{d1 \text{ and } d2}$$

EXPERIMENTAL EXAMPLE 1

Figure 4:
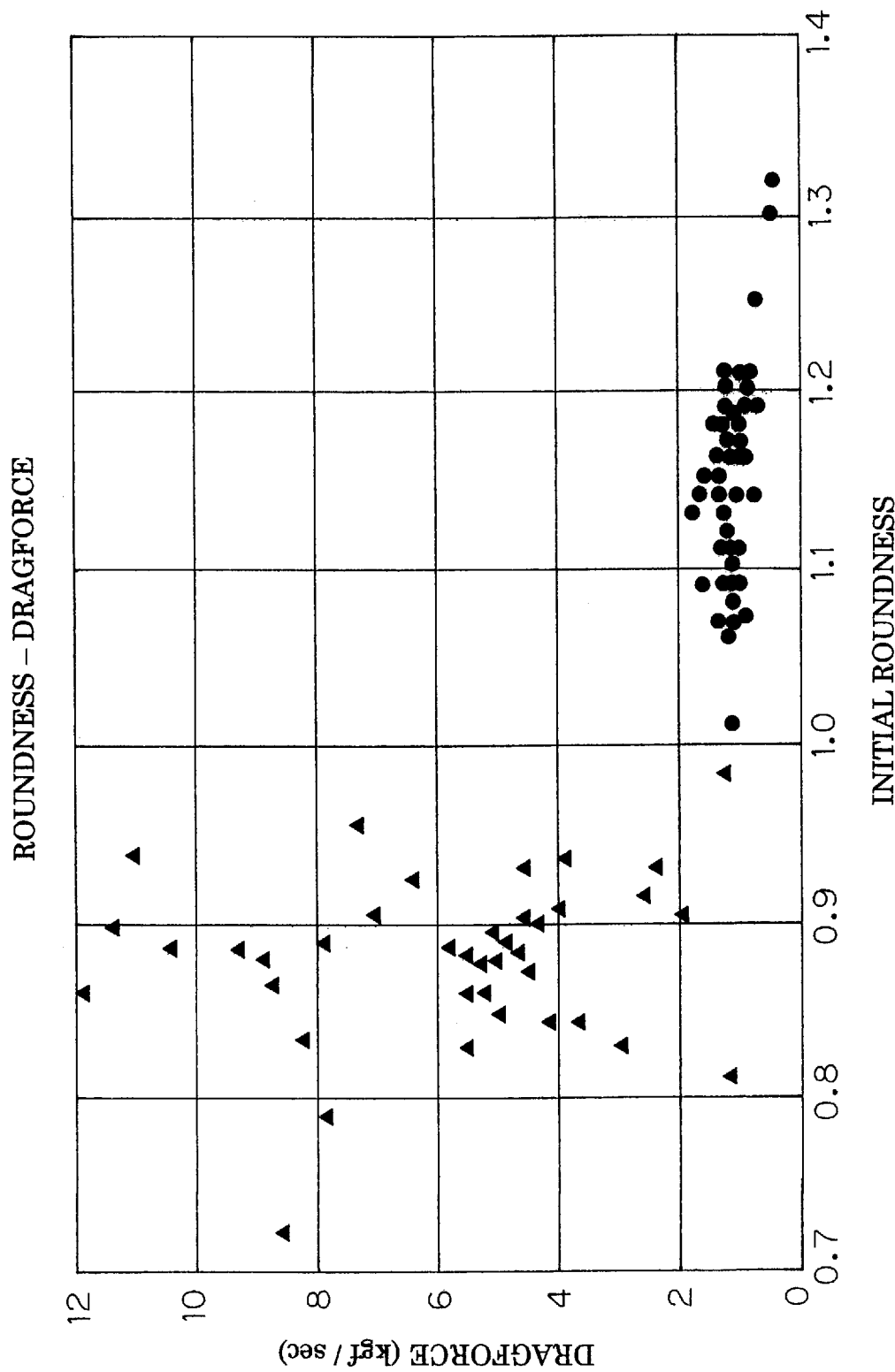
FIG. 4 is a chart showing experimental data from tests conducted on the present invention in an experimental example 1.

FIG. 4 shows results obtained by measuring drag on a variety of brake bands 12 having roundness that varied between 0.97 and 1.04. The amount of measured drag is a numerical value representing energy lost due to the friction between the brake band and the clutch drum. The smaller value of drag indicates a smaller energy loss due to the friction, and thus improved dis-engagement of the brake band from the clutch drum.

In test data depicted in FIG. 4, comparison was made between brake band devices of the present invention having the roundness larger than 1.0 (shown in large black dots) and brake band devices in the prior art having the roundness of 1.0 or less (shown in black triangles). Eight different brake band devices in accordance with the present invention were tested and two conventional brake bands tested. The roundness was measured by a roundness measuring device. Measurement was performed several times for determining the drag amount of each of the foregoing brake bands on the same clutch drum under the same conditions. The roundness was measured before each test (initial roundness). The results of the tests show that the brake band having the roundness larger than 1.0 provided a much smaller drag amount than the brake band having the roundness smaller than 1.0. As a result, the brake band of the roundness which is larger than 1.0 but is smaller than 1.04, and more preferably of the roundness between 1.01 and 1.03 can reduce the drag with respect to the clutch drum.

The portions 121, 122, 123, 124 and 125 provide the strap 12 with a biasing effect that assists in more rapid disengagement from the clutch drum thereby reducing drag.

According to the invention, the releasability (ability to dis-engage) of the brake band in the clutch drum disengagement operation can be improved, and the drag of the brake band during idling of the clutch drum can be suppressed.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A brake band for a brake band device, the brake band device for braking and releasing a cylindrical clutch drum of an automatic transmission, said brake band comprising:

a generally cylindrically shaped strap having a belt-like configuration, said strap having two ends with a gap defined between said ends;

a lining fixed to an inner surface of said strap, and adapted to contact an outer peripheral surface of the clutch drum; and a pair of arc-shaped brackets each fixed to a respective one of said ends of said strap;

wherein said strap is formed with two pairs of slightly deformed portions, each of said deformed portions extending slightly radially inward from other portions of said strap, said deformed portions being located on said strap such that a first inner diameter of said strap extends between a first of said pairs of deformed portions and a second inner diameter extends between a second pair of said deformed portions, said first and second diameters being perpendicular with respect to one another, said other portions of said strap define third and fourth inner diameters, said third inner diameter being perpendicular to said fourth inner diameter, said third inner diameter being offset from said first inner diameter by 45 degrees, said first and second inner diameters being smaller than said third and fourth inner diameters.

2. The brake band as set forth in claim 1, wherein said ends of said strap lie on an arc that coincides with said first inner diameter and a corresponding one of said deformed portions is defined by said ends.

3. The brake band as set forth in claim 2, wherein a roundness of said strap defined as the sum of said third and fourth inner diameters divided by the sum of said first and second inner diameters, as follows:

$$\text{roundness} = \frac{(\text{3rd diameter} + \text{4th diameter})}{(\text{1st diameter} + \text{2nd diameter})}$$

and, said roundness is larger than 1.0 but smaller than 1.04.

* * * * *